United States Patent
Ban et al.

(10) Patent No.: US 12,438,833 B2
(45) Date of Patent: Oct. 7, 2025

(54) METHOD AND APPARATUS FOR MESSAGING SERVICE

(71) Applicant: KAKAO CORP., Jeju-si (KR)

(72) Inventors: Dong Hyun Ban, Seongnam-si (KR);
Han Wool Cha, Seongnam-si (KR);
Dong Hee Hong, Seongnam-si (KR);
Hui Su Kim, Seongnam-si (KR); Na Young Kim, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 0 days.

(21) Appl. No.: 18/316,233

(22) Filed: May 12, 2023

(65) Prior Publication Data
US 2023/0370397 A1    Nov. 16, 2023

(30) Foreign Application Priority Data

May 13, 2022    (KR) .................. 10-2022-0059051

(51) Int. Cl.
*H04L 51/04*    (2022.01)
*H04L 51/10*    (2022.01)

(52) U.S. Cl.
CPC .............. *H04L 51/04* (2013.01); *H04L 51/10* (2013.01)

(58) Field of Classification Search
CPC ............................... H04L 51/04; H04L 51/10
USPC ........................................................ 709/206
See application file for complete search history.

(56) References Cited

U.S. PATENT DOCUMENTS

| | | | | |
|---|---|---|---|---|
| 10,078,673 B2 * | 9/2018 | Nagel | ................. | G06F 3/04886 |
| 10,305,828 B2 * | 5/2019 | Cao | ..................... | G06F 16/9538 |
| 10,664,157 B2 * | 5/2020 | Kong | ..................... | G06F 16/951 |
| 2008/0222256 A1 * | 9/2008 | Rosenberg | ............ | G06F 40/166 |
| | | | | 709/206 |
| 2010/0005069 A1 * | 1/2010 | Wang | ..................... | G06F 16/954 |
| | | | | 715/784 |
| 2010/0131902 A1 * | 5/2010 | Teran | ................. | G06F 16/90328 |
| | | | | 715/810 |
| 2011/0119287 A1 * | 5/2011 | Chen | .................... | G06F 16/2452 |
| | | | | 707/768 |
| 2012/0297294 A1 * | 11/2012 | Scott | ..................... | G06F 40/253 |
| | | | | 715/264 |
| 2014/0195527 A1 * | 7/2014 | Kim | ................... | G06F 16/24575 |
| | | | | 707/723 |

(Continued)

FOREIGN PATENT DOCUMENTS

| KR | 20080078431 A | 8/2008 |
|---|---|---|
| KR | 20130073101 A | 7/2013 |
| KR | 20210090133 A | 7/2021 |

*Primary Examiner* — Nicholas R Taylor
*Assistant Examiner* — Chong G Kim
(74) *Attorney, Agent, or Firm* — Seed Intellectual Property Law Group LLP

(57) ABSTRACT

A messaging service method and apparatus are disclosed. An operating method of a terminal on which an application for a messaging service is installed includes displaying a keyword of a first type in a chat interface, wherein the keyword of the first type is detected from a text input into a message input window of the chat interface in a first input mode, based on a request corresponding to a keyword of a second type detected from the text, changing an input mode of the chat interface to a second input mode, and in response to the input mode being changed, replacing displaying of the keyword of the first type with displaying of an interfacing object corresponding to the keyword of the second type.

20 Claims, 14 Drawing Sheets

(56) References Cited

U.S. PATENT DOCUMENTS

| | | | | |
|---|---|---|---|---|
| 2015/0081653 | A1* | 3/2015 | Hsu | G06F 3/04883 |
| | | | | 707/706 |
| 2016/0180560 | A1* | 6/2016 | Patel | G06F 3/04886 |
| | | | | 345/636 |
| 2016/0203238 | A1* | 7/2016 | Cherniavskii | G06F 16/9535 |
| | | | | 707/722 |
| 2016/0330150 | A1* | 11/2016 | Joe | G06F 3/0486 |
| 2017/0249017 | A1* | 8/2017 | Ryu | G06F 3/018 |
| 2017/0300462 | A1* | 10/2017 | Cudworth | G06F 40/274 |
| 2017/0308292 | A1* | 10/2017 | Choi | G06F 16/248 |
| 2018/0246983 | A1* | 8/2018 | Rathod | G06F 16/972 |
| 2019/0251125 | A1* | 8/2019 | Song | G06F 16/90324 |
| 2022/0043568 | A1* | 2/2022 | Park | G06F 3/0485 |
| 2023/0388407 | A1* | 11/2023 | Zhang | H04L 51/04 |
| 2024/0281488 | A1* | 8/2024 | Zhang | G06F 16/9538 |

\* cited by examiner

METHOD AND APPARATUS FOR MESSAGING SERVICE

CROSS-REFERENCE TO RELATED APPLICATION(S)

This application claims the priority benefit of Korean Patent Application No. 10-2022-0059051 filed on May 13, 2022, in the Korean Intellectual Property Office, the disclosure of which is incorporated herein by reference for all purposes.

BACKGROUND

1. Field

One or more embodiments relate to a method and apparatus for a messaging service. More specifically, the embodiments relate to a terminal on which an application for a messaging service is installed and an operating method of the terminal.

2. Description of the Related Art

The advancement in mobile smart devices has increased the use of online platform services for interaction with other users over a network. The online platform services for interaction with other users may include, as representative examples, a social networking service (SNS) which is an online platform for generating and consolidating social relationships through communication among users, information sharing, and expansion of personal connections, and an instant messaging service (IMS) which is an online platform for real-time content communication between two or more users.

The increase in communication via mobile devices has further allowed the online platform services to support functions for sharing various types of data and assisting communication in addition to a function for users to have one-on-one communication with other users by text.

SUMMARY

An aspect provides a chat interface technology for improving user convenience by combining it with a chat function in a mobile environment.

Another aspect also provides an interfacing technology for providing various functions related to a keyword included in a message through a space of limited size in a chat interface.

However, technical aspects are not limited to the foregoing aspects, and there may be other technical aspects.

According to an aspect, there is provided an operating method of a terminal on which an application for a messaging service is installed including displaying a keyword of a first type in a chat interface, wherein the keyword of the first type is detected from a text input into a message input window of the chat interface in a first input mode, based on a request corresponding to a keyword of a second type detected from the text, changing an input mode of the chat interface to a second input mode, and, in response to the input mode being changed, replacing displaying of the keyword of the first type with displaying of an interfacing object corresponding to the keyword of the second type.

The operating method may further include, when the input mode of the chat interface is changed to the first input mode, adding a mark indicating the keyword of the first type to the text input into the message input window, and when the input mode of the chat interface is changed to the second input mode, adding a mark indicating that the keyword of the second type to the text input into the message input window.

The operating method may further include, when the input mode of the chat interface is changed to the first input mode, replacing the displaying of the interfacing object corresponding to the keyword of the second type with the displaying of the keyword of the first type.

The replacing of the displaying of the keyword of the first type with the displaying of the interfacing object corresponding to the keyword of the second type may include deactivating the displaying of the keyword of the first type and displaying the interfacing object in the chat interface to input an emoticon related to the keyword of the second type.

The displaying of the interfacing object corresponding to the keyword of the second type may include displaying a list of recommended emoticons corresponding to the keyword of the second type, and based on an input of selecting a recommended emoticon, displaying a preview window for the selected emoticon in the chat interface.

A region in which the keyword of the first type is displayed in the chat interface may at least partially overlap a region in which the interfacing object corresponding to the keyword of the second type is displayed.

The operating method may further include, based on an input of selecting a first keyword of the keyword of the first type displayed in the chat interface, setting, for the text, information about a link to a search results page for the first keyword.

The displaying of the keyword of the first type in the chat interface may include, based on an input of selecting at least one of the keyword of the first type displayed in the chat interface, displaying the keyword of the first type by distinguishing between a selected keyword and a yet-to-be-selected keyword.

The keyword of the first type may include at least one word predetermined to correspond to a search term, and the keyword of the second type may include at least one word predetermined for recommending an emoticon.

According to another aspect, there is provided an operating method of a terminal on which an application for a messaging service is installed including detecting a keyword from a text input into a message input window of a chat interface, determining a type of the detected keyword, based on an input received for the detected keyword, setting, for the keyword, an additional function corresponding to the determined type, and based on the set additional function, controlling displaying of the chat interface.

The setting of the additional function may include, when the received input is an input of selecting a first keyword in a region in which a keyword of a first type is displayed, setting, for the text, information about a link to a search results page for the first keyword.

The controlling of the displaying of the chat interface may include, based on the setting of the information about the link, controlling the displaying of the chat interface such that a mark indicating that the information about the link related to the first keyword is set is added.

The setting of the additional function may include, when the received input is an input of requesting an emoticon corresponding to a second keyword of a second type, controlling the displaying of the chat interface such that an interfacing object for inputting the emoticon corresponding to the second keyword is displayed.

The setting of the additional function may include, when the received input is an input of requesting transmission of the text including a third keyword of a third type, adding, to a message corresponding to the text, a function link for calling a function corresponding to the third keyword.

The controlling of the displaying of the chat interface may include, based on the adding of the function link, controlling the displaying of the chat interface such that a mark indicating that a function link related to the third keyword is added is added.

The determining of the type of the detected keyword may include at least one of, based on a set of keywords of a first type in which at least one word predetermined to correspond to a search term is stored, determining whether the detected keyword is a keyword of the first type, based on a set of keywords of a second type in which at least one word predetermined for recommending an emoticon is stored, determining whether the detected keyword is a keyword of the second type, and based on a set of keywords of a third type in which at least one word and character string format predetermined for calling a predetermined function are stored, determining whether the detected keyword is a keyword of the third type.

According to another aspect, there is provided a terminal on which an application for a messaging service is installed may include at least one processor configured to display a keyword of a first type in a chat interface, wherein the keyword of the first type is detected from a text input into a message input window of the chat interface in a first input mode, based on a request corresponding to a keyword of a second type detected from the text, change an input mode of the chat interface to a second input mode, and in response to the input mode being changed, replacing displaying of the keyword of the first type with displaying of an interfacing object corresponding to the keyword of the second type.

The processor may be configured to, when the input mode of the chat interface is changed to the first input mode, add a mark indicating the keyword of the first type to the text input into the message input window, and when the input mode of the chat interface is changed to the second input mode, add a mark indicating the keyword of the second type to the text input into the message input window.

The processor may be configured to, when the input mode of the chat interface is changed to the first input mode, replace the displaying of the interfacing object corresponding to the keyword of the second type with the displaying of the keyword of the first type.

According to another aspect, there is provided A terminal on which an application for a messaging service is installed including at least one processor configured to detect a keyword from a text input into a message input window of a chat interface, determine a type of the detected keyword, based on an input received for the detected keyword, set, for the keyword, an additional function corresponding to the determined type, and based on the set additional function, control a display of the chat interface.

Additional aspects of embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
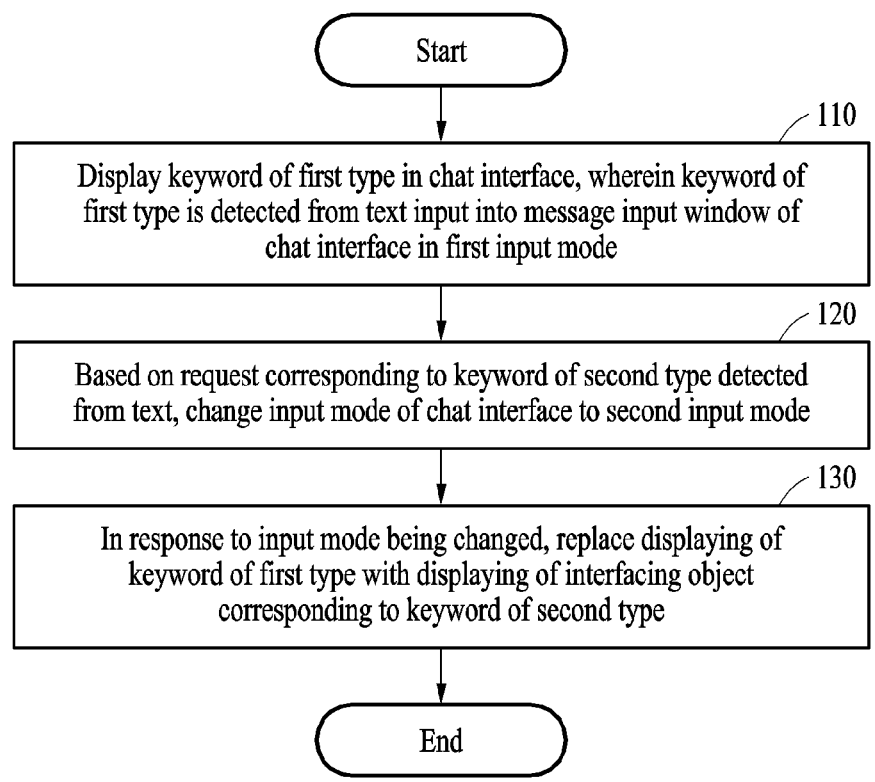
FIG. 1 is a flowchart of an operation of a terminal on which an application for a messaging service is installed according to an embodiment.

The following detailed structural or functional description is provided as an example only and various alterations and modifications may be made to embodiments. Accordingly, the embodiments are not to be construed as limited to the disclosure and should be understood to include all changes, equivalents, or replacements within the idea and the technical scope of the disclosure.

Although terms, such as first, second, and the like are used to describe various components, the components are not limited to the terms. These terms should be used only to distinguish one component from another component. For example, a first component may be referred to as a second component, and similarly the second component may also be referred to as the first component.

It should be noted that, if one component is described as being "connected," "coupled," or "joined" to another component, a third component may be "connected," "coupled," and "joined" between the first and second components, although the first component may be directly connected, coupled, or joined to the second component.

The singular forms "a," "an," and "the" are intended to include the plural forms as well, unless the context clearly indicates otherwise. It will be further understood that the terms "comprises/comprising" and/or "includes/including," when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which the present disclosure pertains. Terms, such as those defined in commonly used dictionaries, are to be interpreted as having a meaning that is consistent with their meaning in the context of the relevant art and the disclosure of the present application and is not to be interpreted in an idealized or overly formal sense unless expressly so defined herein.

Hereinafter, embodiments will be described in detail with reference to the accompanying drawings. When describing the embodiments with reference to the accompanying drawings, like reference numerals refer to like components and a repeated description related thereto will be omitted.

FIG. 1 is a flowchart of an operation of a terminal on which an application for a messaging service is installed according to an embodiment.

Referring to FIG. 1, according to an embodiment, an operating method of a terminal on which an application for a messaging service is installed may include operation 110 of displaying a keyword of a first type in a chat interface, wherein the keyword of the first type is detected from a text input into a message input window of the chat interface in a first input mode, operation 120 of, based on a request corresponding to a keyword of a second type detected from the text, changing an input mode of the chat interface to a second input mode, and operation 130 of, in response to the input mode being changed, replacing displaying of the keyword of the first type with displaying of an interfacing object corresponding to the keyword of the second type.

The terminal may be one of electronic apparatuses such as a computer, a portable computer, a wireless phone, a mobile phone, a smartphone, a personalized digital assistant (PDA), a web tablet, a wearable device, and the like, and may refer to any apparatus that may install and execute an application. The terminal may receive a service and/or content provided by a server under the control of the application. For example, under the control of the application, the terminal may perform overall service operations such as service screen setting, data input, data transmission and reception, and data storage. For example, the terminal may process a user interface or user interaction through a processor and output a processing result through an output device of the terminal or transmit the processing result to a server.

According to an embodiment, the application installed on the terminal may include a messenger application. Under the control of the messenger application, the terminal may receive a messaging service provided by a messaging server or a server.

According to an embodiment, the server may provide a messaging service that receives or transmits messages between users subscribing to the service or transmitting a notification message to a subscribing user. For example, the messaging service may include an instant messaging service based on instant messages transmitted and received through a messenger application installed on a terminal of the subscribing user.

According to an embodiment, the server may create a user account related to a messaging service in response to a messaging service subscription request from the user. The user account may be a unit for identifying, by a server, a user subscribing to a service. The terminal logging in to the user account may use a service provided by the server. Hereinafter, the terminal may be a terminal logging in to the user account created by service subscription.

According to an embodiment, the messaging service may be provided to the terminal through a chat interface. The chat interface may be an interface for a message transmission/reception function provided by the messaging service and may, for example, include an interface that provides a function for transmitting messages through a chatroom in which at least one user account participates and displaying received messages. The chat interface may correspond to a chatroom, which is a virtual space in which at least one user account participates and a chat between users takes place.

Figure 2A:
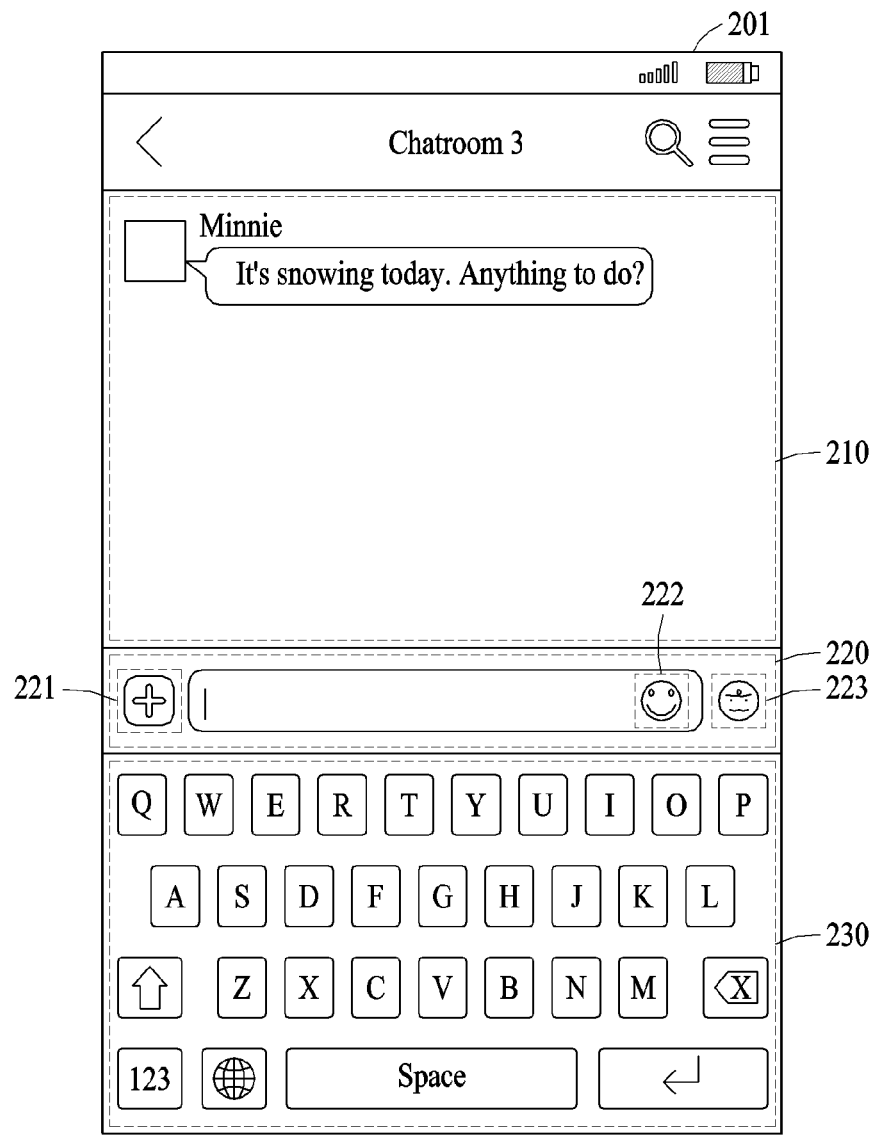
FIG. 2A illustrates an example of a screen of a chat interface according to an embodiment.

For example, the chat interface may include an interfacing object that supports a function for transmitting and receiving messages through a chatroom. The interfacing object may be an object implemented to perform a predetermined function through interaction with a user and may include, for example, a button, an input field, a switch, and the like. FIG. 2A illustrates a screen 201 as an example of a chat interface. For example, referring to FIG. 2A, the chat interface may include a chat window 210 displaying messages transmitted and received through a chatroom, a message input window 220 in which a text to be transmitted as a message is input, a virtual keyboard region 230 for inputting a text, and/or an interfacing object that supports functions related to a messaging service, such as buttons 221, 222, and 223 for transmitting a request for a predetermined function or service to the messaging service. A message input window in which a text is input is a partial region of the message input window region 220 other than regions in which interfacing objects (e.g., the buttons 221, 222, and 223) are displayed. Hereinafter, the message input window region 220 may be referred to as a message input window.

In operation 110, the terminal may display the keyword of the first type in the chat interface, wherein the keyword of the first type is detected from the text input into the message input window. An input mode of the chat interface may correspond to a first input mode. The input mode of the chat interface may be differentiated based on a type of content input through the chat interface to be transmitted as a message. For example, the first input mode may correspond to a mode in which a text is input, and a second input mode may correspond to a mode in which an emoticon is input. An emoticon may be variously referred to as an image, an emoji, a sticker, and the like, and may be replaced with content other than text.

The keyword of the first type may be used as a search term and may include, for example, a name of a subway station (e.g., Gangnam, Seoul National University of Education, Sinsa, etc.), a name of a place (e.g., "a" restaurant, "b" movie theater, "cc" mall, etc.), a category name of a place (e.g., restaurant, good place to eat, coffee shop, movie theater, park, etc.), and a name of a celebrity. For example, the keyword of the first type may include at least one word predetermined to correspond to the search term. For example, a word that is determined to have a high probability of being searched for while users exchange messages to have a conversation and/or a search term for which search results are frequently shared while users exchange messages may be designated as the keyword of the first type.

According to an embodiment, a set of word(s) designated as the keyword of the first type (hereinafter, referred to as "set of keywords of the first type") may be stored in the terminal. For example, the terminal may update a set of keywords of the first type stored in the terminal based on a set of keywords of the first type registered in the server. When the update of the set of keywords of the first type registered in the server is detected, or at regular intervals, the terminal may update the set of keywords of the first type stored in the terminal based on the set of keywords of the first type registered in the server. The terminal may obtain, from the server, a keyword of the first type that is not stored in the terminal among keywords of the first type registered in the server and add the obtained keyword of the first type to the set of keywords of the first type. Alternatively, the set of keywords of the first type stored in the terminal may be replaced with the set of keywords of the first type registered in the server. According to an embodiment, the terminal may not store a set of keywords of the first type separately and may use a set of keywords of the first type stored in a database of keywords of the first type accessible from the server.

According to an embodiment, the terminal may detect the keyword of the first type from an input text based on the set of keywords of the first type. For example, the terminal may detect the keyword of the first type from the input text by determining whether a word included in the text input through the message input window is a word included in the set of keywords of the first type. For example, when the set of keywords of the first type includes "Seongsu-dong", "cake", and the like, "Seongsu-dong" and "cake" included in the set of keywords of the first type may be detected as keywords of the first type from "Let's go to Seongsu-dong to have a cake party" input into the message input window.

According to an embodiment, at least one keyword of the first type detected from the text input into the message input window may be displayed in a predetermined region of the chat interface. When a plurality of keywords of the first type is detected from the input text, the detected plurality of keywords of the first type may be accumulated and displayed in the predetermined region. This means that every time a keyword of the first type is detected, a newly detected keyword of the first type is additionally displayed in a region in which a previously detected keyword of the first type is displayed. Hereinafter, the predetermined region of the chat interface in which a keyword of the first type is displayed may be referred to as a suggestion region.

Figure 2B:
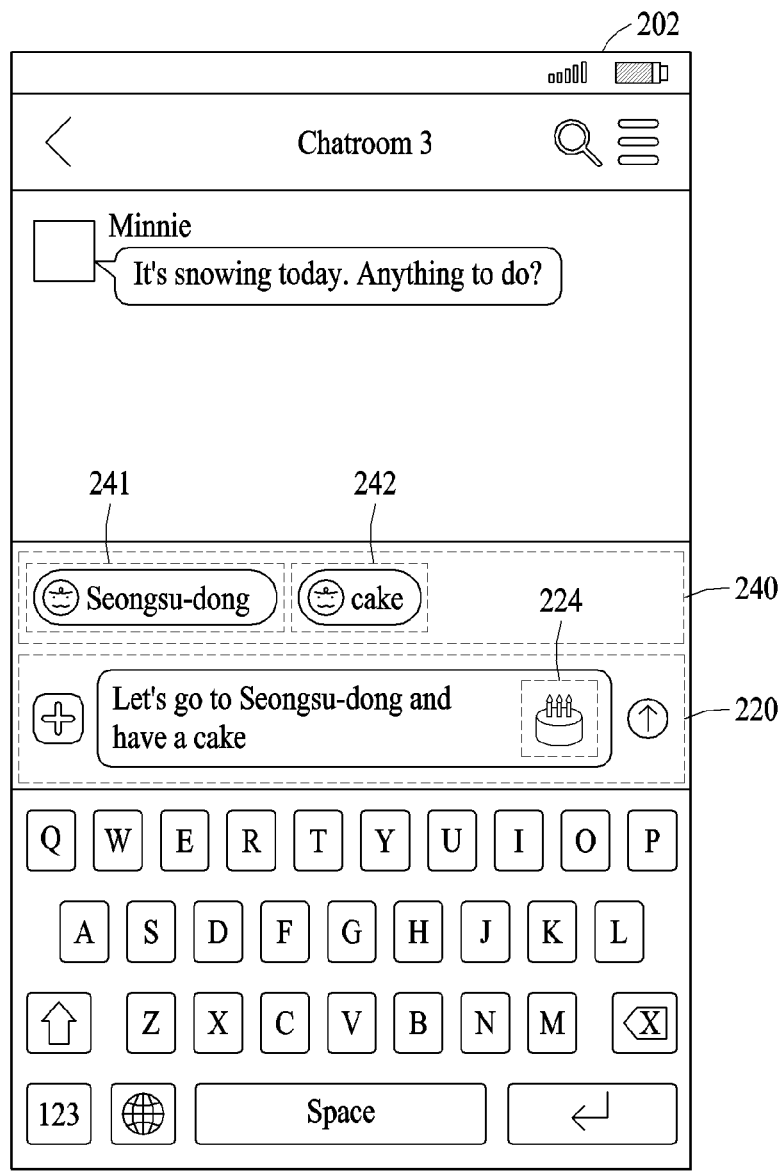
FIG. 2B illustrates an example of a screen of a chat interface on which a keyword of a first type is displayed according to an embodiment.

For example, referring to a screen 202 illustrated in FIG. 2B, the chat interface may include a suggestion region 240 in which the keyword of the first type detected from the text input into the message input window 220 is displayed. The suggestion region 240 may be displayed in the chat interface in response to at least one keyword of the first type being detected from the text input into the message input window 220. The suggestion region 240 may include displays 241 and 242 of keywords of the first type (e.g., "Seongsu-dong" and "cake") detected from "Let's go to Seongsu-dong to have a cake". The displays 241 and 242 of the keywords of the first type included in the suggestion region 240 may be implemented as an interfacing object that may interact with a user. For example, the displays 241 and 242 of the keywords of the first type may be implemented as a button that receives a selection input and performs a function for adding a link to a selected keyword in response to the selection input.

According to an embodiment, based on an input of selecting a first keyword of the keyword of the first type displayed in the chat interface, the terminal may set information about a link for a word corresponding to the first keyword of the text input into the text input window. For example, an operation of setting the information about the link for the word corresponding to the keyword of the first type may include adding a link to the word and/or adding information required to add the link to the word. For example, the link set for the word corresponding to the keyword of the first type may include various types of links, such as a search link to a search results screen of a web browser using the keyword as a search term and a link to execute an application corresponding to the keyword.

According to an embodiment, the terminal may receive the input of selecting the keyword of the first type displayed in the suggestion region from the user. For example, a touch or click input for a region in the suggestion region in which the keyword of the first type is displayed may be recognized as an input of selecting the keyword. The suggestion region may include a button for selecting the keyword in the region in which the keyword of the first type is displayed such that the user may select the keyword of the first type displayed in the suggestion region. Alternatively, the region in the suggestion region in which the keyword of the first type is displayed may be implemented as a button for receiving the selection input. According to an embodiment, operation 110 may include displaying the keyword of the first type by distinguishing between a selected keyword and a yet-to-be-selected keyword based on an input of selecting at least one of the keyword of the first type displayed in the chat interface. In other words, displaying of a keyword of the first type before the keyword is selected and displaying of the keyword of the first type after the keyword is selected may be different such that the user may visually recognize through the chat interface the keyword of the first type for which information about a link is set.

Figure 3:
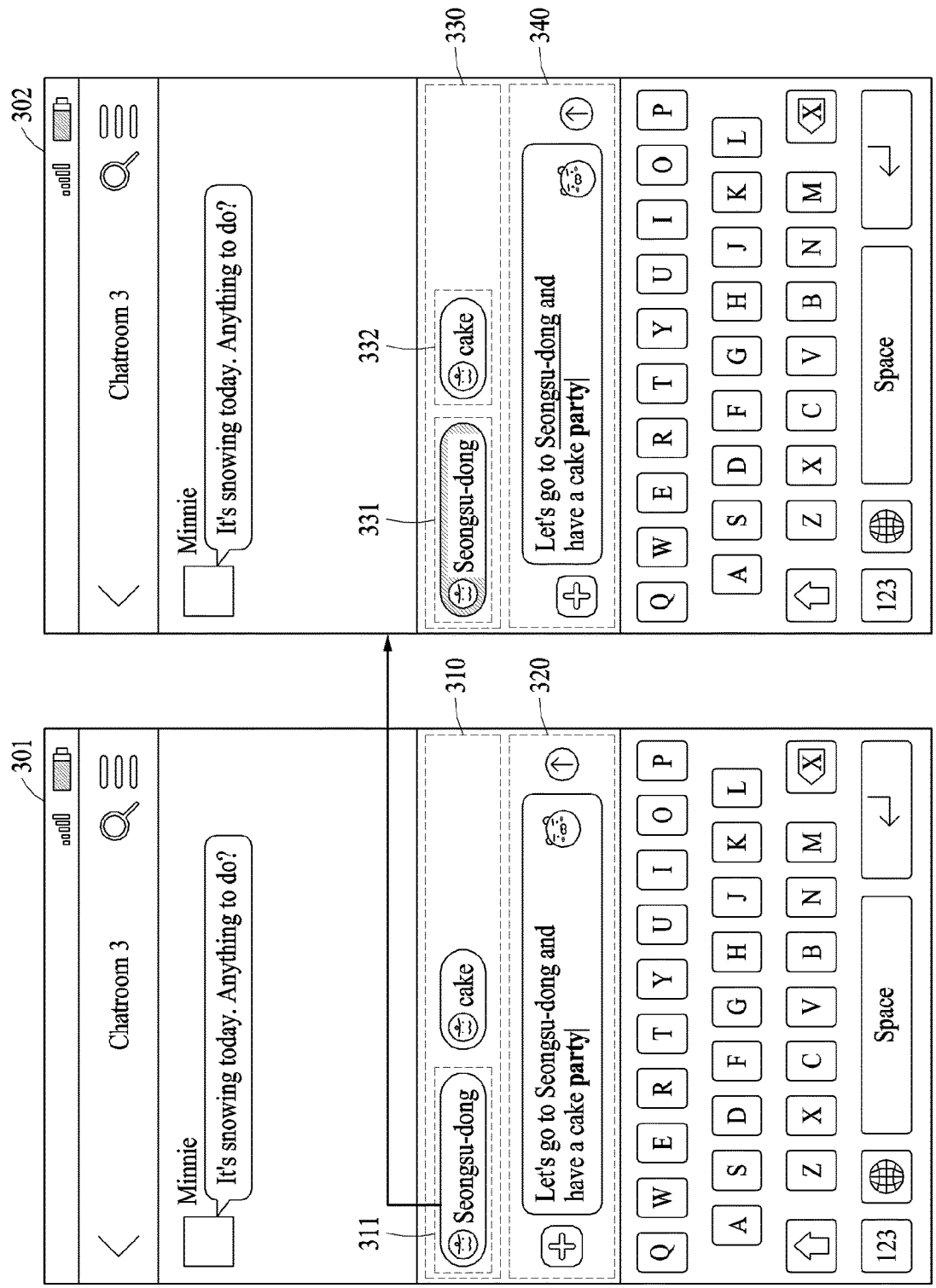
FIG. 3 illustrates an example of a screen of a chat interface in a first input mode according to an embodiment.

For example, referring to a screen 301 of a chat interface illustrated in FIG. 3, a terminal may receive an input of selecting a first keyword 311 of a first type through a suggestion region 310. When the input of selecting the first keyword 311 is detected, information about a link corresponding to the first keyword 311 may be set for a text input into a message input window 320. For example, the information about the link corresponding to the first keyword 311 may be set for "Seongsu-dong" corresponding to the first keyword 311 of the text input into the message input window 320.

The screen 301 of the chat interface may be switched to a screen 302 in response to the input of selecting the first keyword 311. Referring to the switched screen 302 of the chat interface, in the suggestion region 330, a region in which the first keyword 331 that is selected is displayed may be displayed in a different color from a region in which a second keyword 332 that is not selected is displayed.

According to an embodiment, operation 110 may include displaying the text input in the message input window by distinguishing between a text corresponding to a selected keyword and a text not corresponding to the selected keyword based on an input of selecting at least one of the keyword of the first type displayed in the chat interface.

For example, referring to the screen 302 illustrated in FIG. 3, a text input into a message input window 340 may be displayed such that "Seongsu-dong" corresponding to the first keyword 331 that is selected is underlined or displayed in a different color from a text not corresponding to the selected keyword. In this way, the text corresponding to the selected keyword may be displayed by being distinguished from the text not corresponding to the selected keyword.

According to an embodiment, the text for which the information about the link is set may be transmitted in a form of a message to a terminal of a receiver in response to a message transmission request received from the user. The terminal that receives the message may turn a text corresponding to a keyword of the first type in the received message into hypertext that links to an execution screen or page (e.g., a search results page and an application execution page) of various functions for the keyword of the first type based on the information about the link set for the keyword of the first type.

Figure 4:
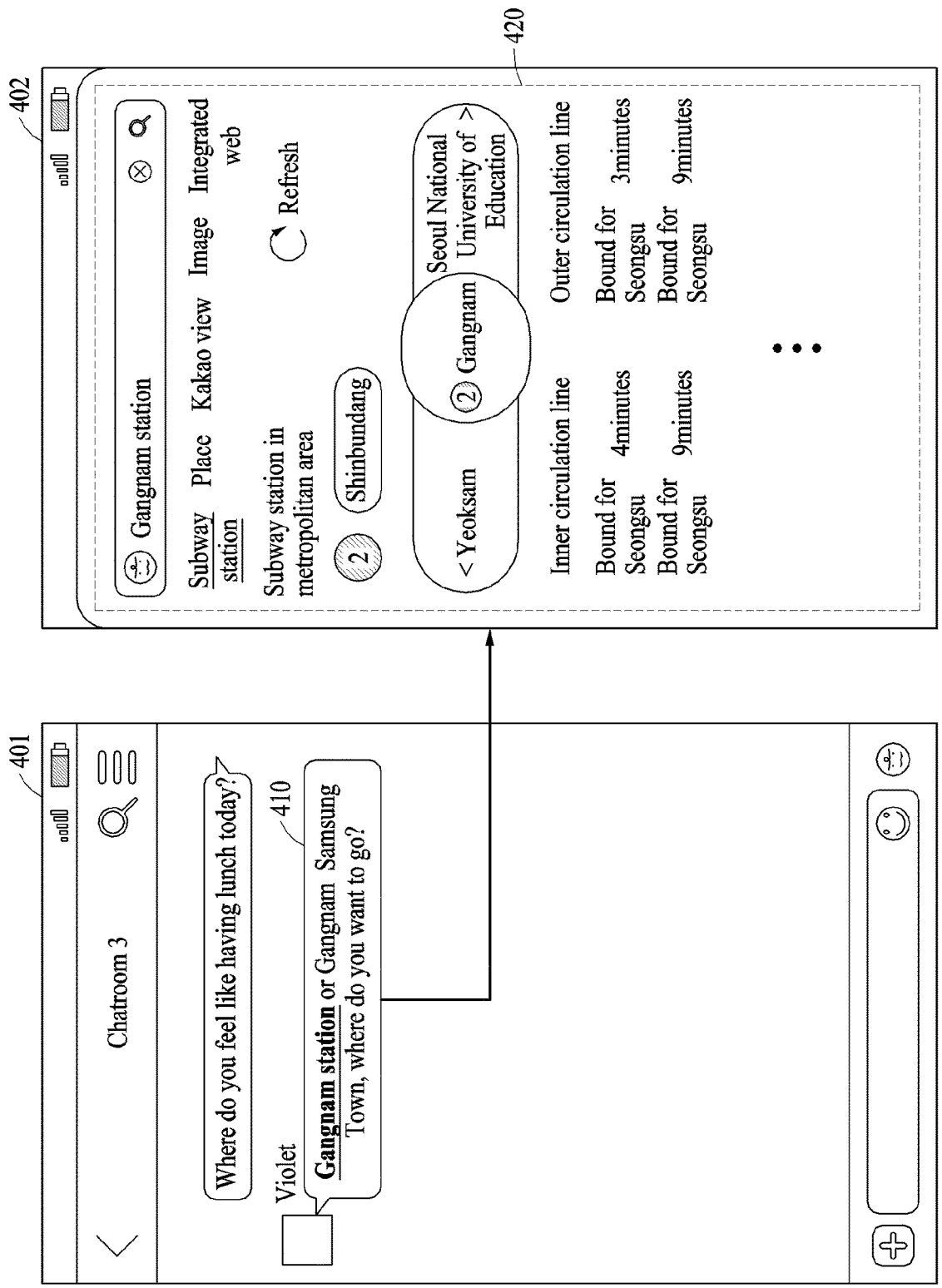
FIG. 4 illustrates an example of a screen of a chat interface in which a search results page is provided by a link set in a message according to an embodiment.

For example, referring to a screen 401 illustrated in FIG. 4, a message 410 including a keyword "Gangnam station" to which a link is added may be displayed through a chat interface. In the message 410 that is transmitted, the keyword "Gangnam station" to which the link is added may be displayed to be distinguished from other texts to which no link is added. For example, unlike other texts in the message 410, the keyword "Gangnam station", to which the link is added, in the message 410 that is transmitted, may be underlined.

According to an embodiment, when an input of selecting a keyword, to which a link is added, in the message 410 is received, a search results page for the keyword may open through the link. Referring to a screen 402, a search results page 420 for a search term "Gangnam station" that opens through a link may be displayed through the chat interface.

According to an embodiment, the search results page that opens through the link may be determined differently based on an environment in which the search results page is executed. For example, the search results page that opens through the link may be determined differently depending on whether the search results page is executed on a mobile terminal or a personal computer (PC).

According to an embodiment, in operation 120, the terminal may change the input mode of the chat interface to the second input mode based on a request for an emoticon corresponding to the keyword of the second type detected from the text.

According to an embodiment, the keyword of the second type may be a word that may match an emoticon and may include a word describing the emoticon and/or a word representing the context in which the emoticon is used, such as "birthday", "congratulations", "hello", "good night", "fried chicken", "heart", and the like. For example, the keyword of the second type may include at least one word predetermined for recommending an emoticon. For example, a word that may be expressed using an emoticon while users exchange messages to have a conversation and/or a word representing the context in which an emoticon is frequently used while users exchange messages may be designated as the keyword of the second type.

According to an embodiment, a set of word(s) designated as the keyword of the second type (hereinafter, referred to as "set of keywords of the second type") may be stored in the terminal. For example, the terminal may update a set of keywords of the second type stored in the terminal based on a set of keywords of the second type registered in the server. When the update of the set of keywords of the second type registered in the server is detected, or at regular intervals, the terminal may update the set of keywords of the second type stored in the terminal based on the set of keywords of the second type registered in the server. The terminal may obtain, from the server, a keyword of the second type that is not stored in the terminal among keywords of the second type registered in the server and add the obtained keyword of the second type to the set of keywords of the second type. Alternatively, the set of keywords of the second type stored in the terminal may be replaced with the set of keywords of the second type registered in the server. According to an embodiment, the terminal may not store a set of keywords of the second type separately and may use a set of keywords of the second type stored in a database of keywords of the second type accessible from the server. For example, the set of keywords of the second type may include a pairing of a word designated as a keyword of the second type and a hint emoticon. The hint emoticon is an emoticon corresponding to the keyword of the second type. For example, a hint emoticon stored as the pair for a keyword of the second type may be displayed on a button 511, illustrated in FIG. 5A, that requests an emoticon corresponding to the keyword of the second type.

According to an embodiment, the terminal may detect the keyword of the second type from a text input based on the set of keywords of the second type. For example, the terminal may detect the keyword of the second type from the input text by determining whether a word included in the text input through the message input window is a word included in the set of keywords of the second type. For example, when words such as "cake", "party", and the like are included in the set of keywords of the second type, "cake" and "party" included in the set of keywords of the second type may be detected as keywords of the second type from the input text "Let's go to Seongsu-dong to have a cake party".

According to an embodiment, the terminal may receive a request corresponding to the detected keyword of the second type. For example, the request corresponding to the keyword of the second type may include an emoticon request requesting a recommendation of an emoticon related to the keyword of the second type. The chat interface may include an interfacing object (e.g., a button) for receiving the emoticon request corresponding to the keyword of the second type. When a predetermined word is detected as the keyword of the second type from the text input into the message input window, the interfacing object for requesting an emoticon corresponding to the word may be activated. The emoticon request corresponding to the word detected as a keyword of the second type may be input through the interfacing object for requesting the emoticon.

According to an embodiment, the predetermined word may correspond to a keyword of the first type and a keyword of the second type. When the predetermined word corresponds to the keyword of the first type and the keyword of the second type, the word may be displayed as the keyword of the first type in a suggestion region. In addition, the interfacing object for requesting the emoticon corresponding to the word may be activated. For example, referring to the screen 202 illustrated in FIG. 2B, "cake" included in the text input into the message input window 220 may correspond to the keyword of the first type and the keyword of the second type. The display 242 of the keyword of the first type "cake" may be added to the suggestion region 240. Also, the interfacing object 224 for receiving an emoticon request corresponding to the detected keyword of the second type "cake" may be activated. For example, the interfacing object 224 may be implemented as a button for receiving a selection input, and the interfacing object 224 may be displayed as a hint emoticon related to "cake" corresponding to the detected keyword of the second type.

According to an embodiment, the terminal may change the input mode of the chat interface from the first input mode to the second input mode in response to the emoticon request corresponding to the keyword of the second type. The input mode of the chat interface may be changed from the first input mode, which is a mode in which a text is input, to the second input mode, which is a mode in which an emoticon is input by the emoticon request related to the keyword of the second type.

According to an embodiment, in operation 130, the terminal may replace the displaying of the keyword of the first type with the displaying of the interfacing object corresponding to the keyword of the second type in response to the input mode being changed. That the input mode is changed means that the input mode is changed from the first input mode to the second input mode. For example, the interfacing object corresponding to the keyword of the second type may include an interfacing object for inputting the emoticon corresponding to the keyword of the second type.

According to an embodiment, operation 130 may include an operation of deactivating the displaying of the keyword of the first type and an operation of displaying the interfacing object for inputting the emoticon corresponding to the keyword of the second type in the chat interface.

According to an embodiment, the operation of displaying the interfacing object corresponding to the keyword of the second type may include an operation of displaying a list of recommended emoticons corresponding to the keyword of the second type and an operation of, based on an input of selecting a recommended emoticon, displaying a preview window for the selected emoticon in the chat interface.

According to an embodiment, in the chat interface, a region in which the keyword of the first type is displayed may partially overlap a region in which the interfacing object for inputting an emoticon is displayed. In other words, the suggestion region may at least partially overlap a region in which the list of recommended emoticons is displayed and/or a region in which a preview window for an emoticon is displayed.

Figure 5A:
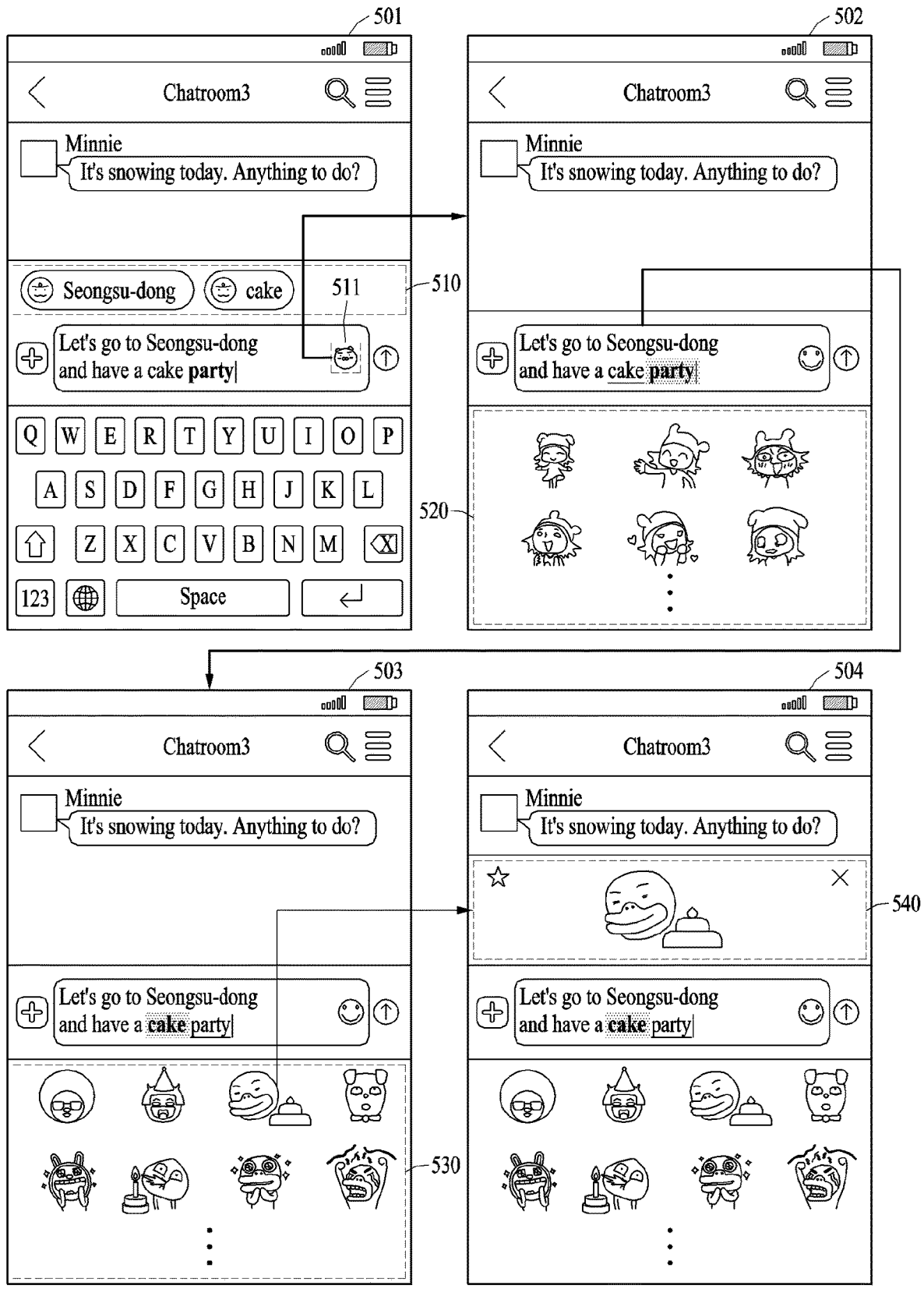
FIGS. 5A and 5B illustrate examples of a screen of a chat interface of which an input mode is changed according to an embodiment.

For example, referring to a screen 501 of a chat interface in a first input mode illustrated in FIG. 5A, an input of selecting the button 511 in a state in which the keyword of the second type "party" is selected may correspond to an input of an emoticon request corresponding to the keyword "party". The keyword of the second type may be set to be in a state of being selected by a selection input of a user and may be set to be in a state of being automatically selected by the terminal. For example, a recently detected keyword of the second type may be set to be in a state of being automatically selected. When the emoticon request corresponding to the keyword "party" is received, the input mode of the chat interface may be changed to the second input mode.

Referring to a screen 502 of the chat interface in the second input mode, displaying of the suggestion region may be deactivated, and a list 520 of recommended emoticons corresponding to the keyword "party" may be displayed. The list 520 of recommended emoticons may include at least one emoticon matching the keyword "party".

According to an embodiment, in the second input mode, as the selected keyword of the second type is changed, the list of recommended emoticons may be changed. For example, referring to a screen 503 of the chat interface, when the selected keyword of the second type is changed from "party" to "cake", the interfacing object for inputting an emoticon to be displayed in the chat interface may be changed to a list 530 of recommended emoticons corresponding to the keyword "cake". When an input of selecting the keyword "cake" displayed in the message input window is received from the user, the selected keyword of the second type may be changed to "cake".

According to an embodiment, the list 530 of recommended emoticons may receive an input of selecting at least one emoticon included in the list of recommended emoticons. In response to the input of selecting the at least one emoticon included in the list 530 of recommended emoticons, the screen 503 of the chat interface may be switched to a screen 504. Referring to the screen 504 of the chat interface, the chat interface may include a preview window 540 for the selected emoticon. For example, a region in which the preview window 540 for an emoticon is displayed may partially overlap the suggestion region in which the keyword of the first type is displayed.

According to an embodiment, the terminal may change a mark related to a keyword in the message input window in response to the input mode being changed. For example, when the chat interface is in the first input mode, a mark indicating the keyword of the first type may be added to the text input into the message input window. When the chat interface is in the first input mode, a mark indicating the keyword of the second type may be added to the text input into the message input window.

Figure 5B:
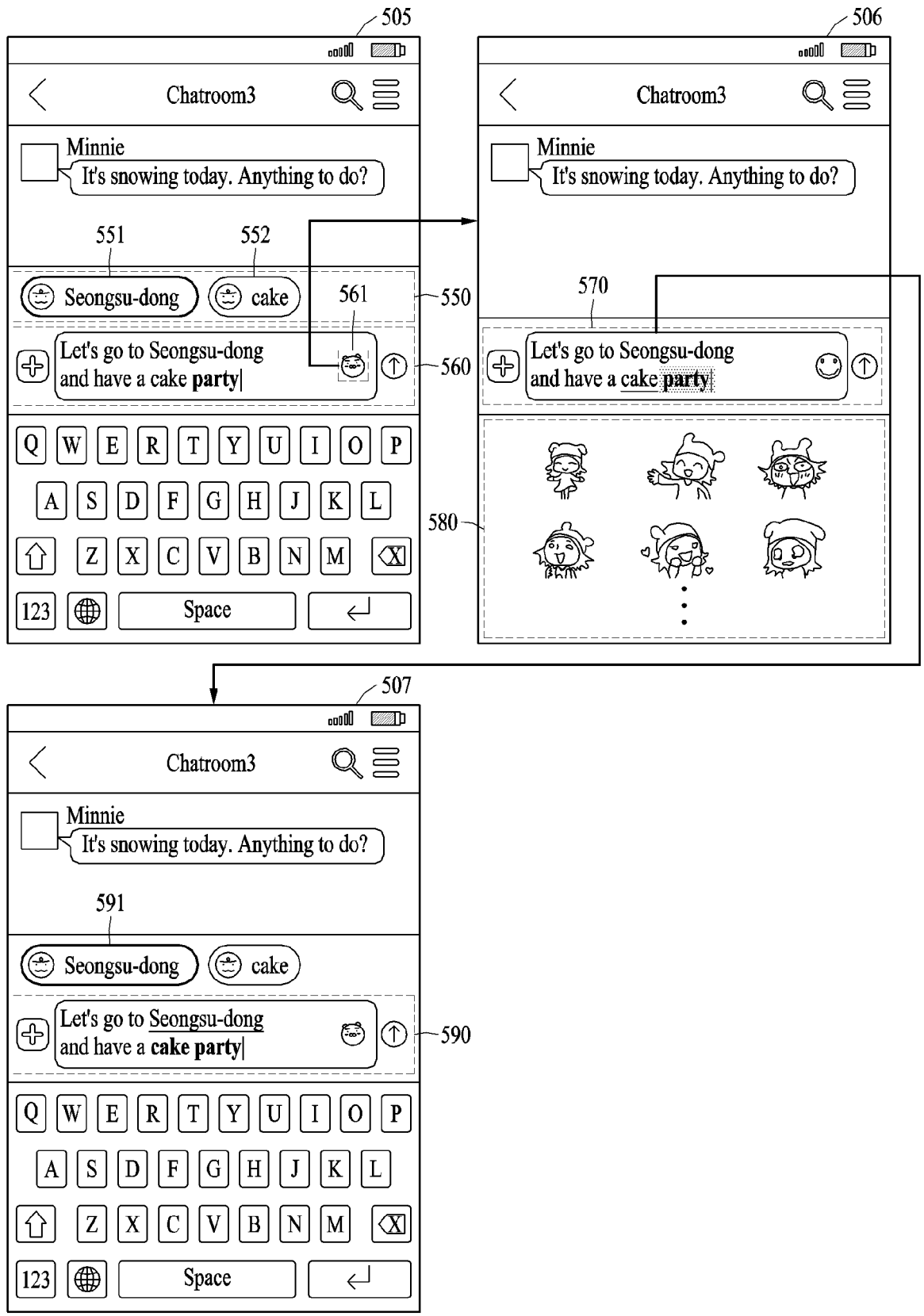

For example, referring to a screen 505 of the chat interface in the first input mode illustrated in FIG. 5B, when a first keyword 551 of the first type is selected through a suggestion region 550, the mark indicating the keyword of the first type may be added to the text input into a message input window 560. A mark indicating the text is a linked keyword may be added to the text "Seongsu-dong" corresponding to the first keyword 551 input into the message input window 560. For example, unlike other texts, an underline may be added to "Seongsu-dong" corresponding to the first keyword 551 of the text input into the message input window 560. As described above, a region in which the selected first keyword 551 is displayed in the suggestion region 550 may be displayed in a different color from a region in which a yet-to-be-selected second keyword 552 is displayed.

According to an embodiment, the chat interface may be switched to a screen 506 of the chat interface in the second input mode by an input of selecting the button 511 in the state in which the keyword of the second type "party" is selected. Referring to the screen 506 of the chat interface in the second input mode, the chat interface may be changed such that a mark indicating the keyword of the second type is added to the text input into a message input window 570. For example, the underline mark indicating that the text is a linked keyword, added to the text "Seongsu-dong" corresponding to the first keyword 551, may be removed, and the mark indicating that the text is the keyword of the second type may be added to the keywords of the second type "cake" and "party". The mark indicating that the text is the keyword of the second type may be added to the keywords of the second type "cake" and "party" in the message input window 570. For example, the keywords of the second type "cake" and "party" may be underlined or highlighted, or their colors may be changed. The keyword "party", which is a selected keyword of the keywords of the second type, may be shaded in the message input window 570. A list 580 of recommended emoticons may include recommended emoticons related to a selected keyword of keywords of the second type.

According to an embodiment, in the second input mode, the chat interface may be switched to a screen 507 of the chat interface in the first input mode by an input of selecting the message input window 570. Referring to the screen 507 of the chat interface in the first input mode, the chat interface may be changed such that the mark indicating the keyword of the first type is added to the text input into a message input window 590. In other words, as the input mode is changed back to the first input mode from the second input mode, the chat interface may be changed such that a mark added to the text input into the message input window 590 is the same as the mark added to the text input into the message input window 560 of the screen 505. For example, unlike other texts, "Seongsu-dong" corresponding to a keyword 591 of the first type of the text input into the message input window 590 may be underlined.

Referring back to FIG. 1, according to an embodiment, when the input mode of the chat interface is changed to the first input mode, the operating method of the terminal may further include an operation of replacing the displaying of the interfacing object for inputting an emoticon with the displaying of the keyword of the first type. In other words, when the input mode is changed from the second input mode to the first input mode, the displaying of the keyword of the first type may be activated again, and the displaying of the interfacing object for inputting an emoticon may be deactivated.

According to an embodiment, when the second input mode is terminated, the input mode of the chat interface may be changed back to the first input mode. For example, the second input mode may be terminated by an input of selecting a message input window to input a text.

Figure 6:
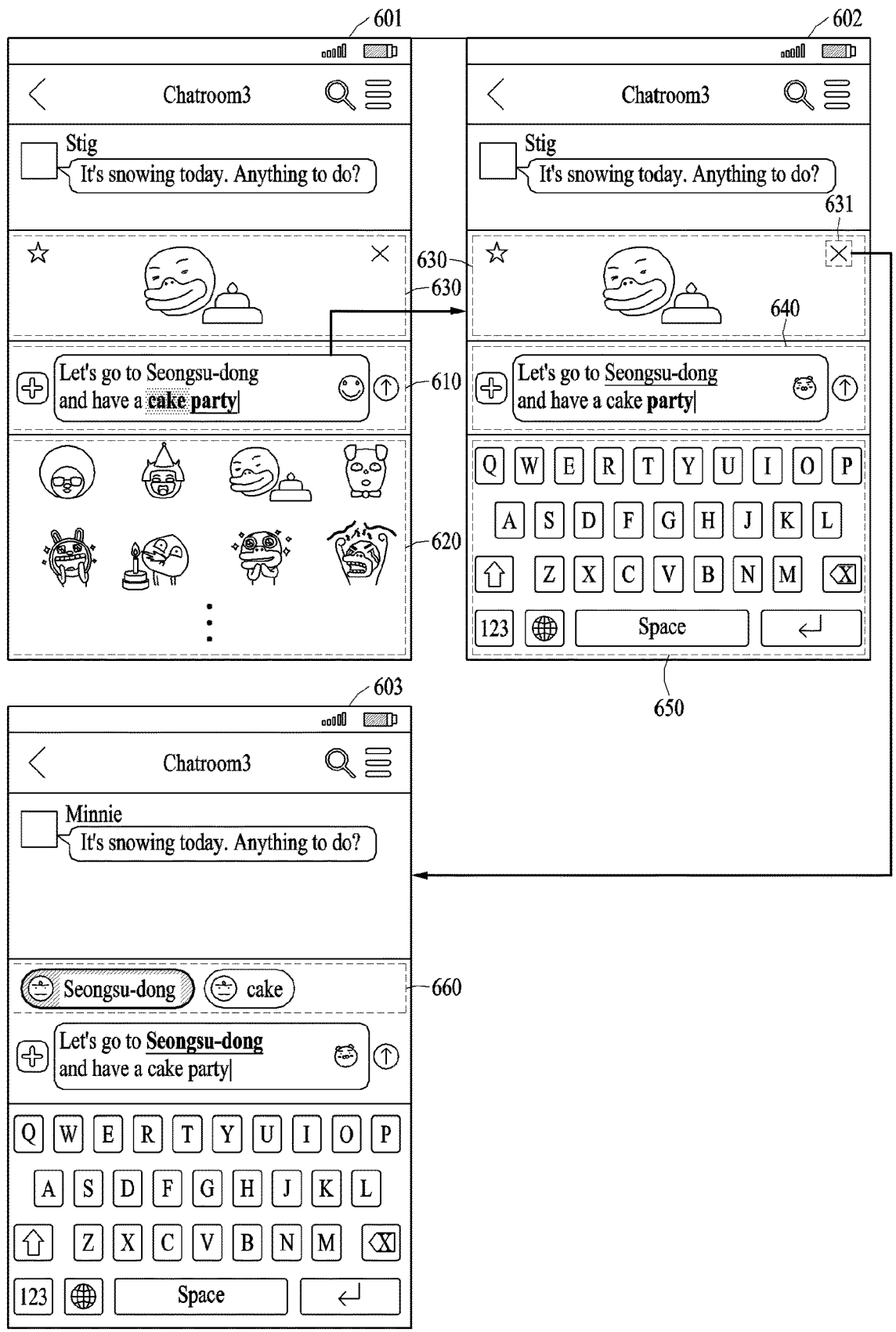
FIG. 6 illustrates an example of a screen of a chat interface of which an input mode is changed according to an embodiment.

Referring to a screen 601 of a chat interface illustrated in FIG. 6, the chat interface in a second input mode may include a list 620 of recommended emoticons and a preview window 630 for an emoticon, which correspond to interfacing objects for inputting an emoticon. In response to an input of selecting a message input window 610 in the second input mode, the second input mode may be terminated, and an input mode of the chat interface may be changed to a first input mode. As the input mode is changed from the second input mode to the first input mode, the screen 601 of the chat interface may be switched to a screen 602.

For example, referring to the screen 602 of the chat interface, the displaying of the list of recommended emoticons may be deactivated, and a virtual keyboard region 650 for inputting a text into a message input window may be displayed. In addition, the chat interface may be changed such that an underline, which is a mark indicating that the text is a keyword of a first type, is added to the text input into a message input window 640.

According to an embodiment, the chat interface in the first input mode may include a suggestion area displaying a detected keyword of the first type. As described above, the suggestion region corresponding to the first input mode and a region, in which the preview window for an emoticon is displayed, corresponding to the second input mode may at least partially overlap with each other. In this case, it may be determined that the suggestion region or the preview window for an emoticon, but not both, is displayed in the chat interface based on a predetermined order of priority.

For example, referring to the screen 602 of FIG. 6, when the preview window 630 for an emoticon has a higher priority than the suggestion region, the preview window 630 for an emoticon may be displayed, and displaying of the suggestion region may be deactivated in the chat interface of which the input mode is changed to the first input mode. Contrary to the screen 602 illustrated in FIG. 6, when the preview window 630 for an emoticon has a lower priority than the suggestion region, displaying of the preview window 630 for an emoticon may be deactivated and the suggestion region may be displayed in the chat interface of which the input mode is changed to the first input mode. However, both the preview window 630 for an emoticon and the suggestion region may be displayed in the chat interface.

Referring to the screen 602 of FIG. 6, in response to an input of selecting a button 631 for closing the preview window, displaying of the interfacing object for inputting an emoticon may be terminated. In response to the displaying of the interfacing object for inputting an emoticon being terminated, the screen 602 of the chat interface may be switched to a screen 603. Referring to the screen 603 of the chat interface, displaying of a suggestion region 660 may be activated again in the chat interface in the first input mode.

Figure 7:
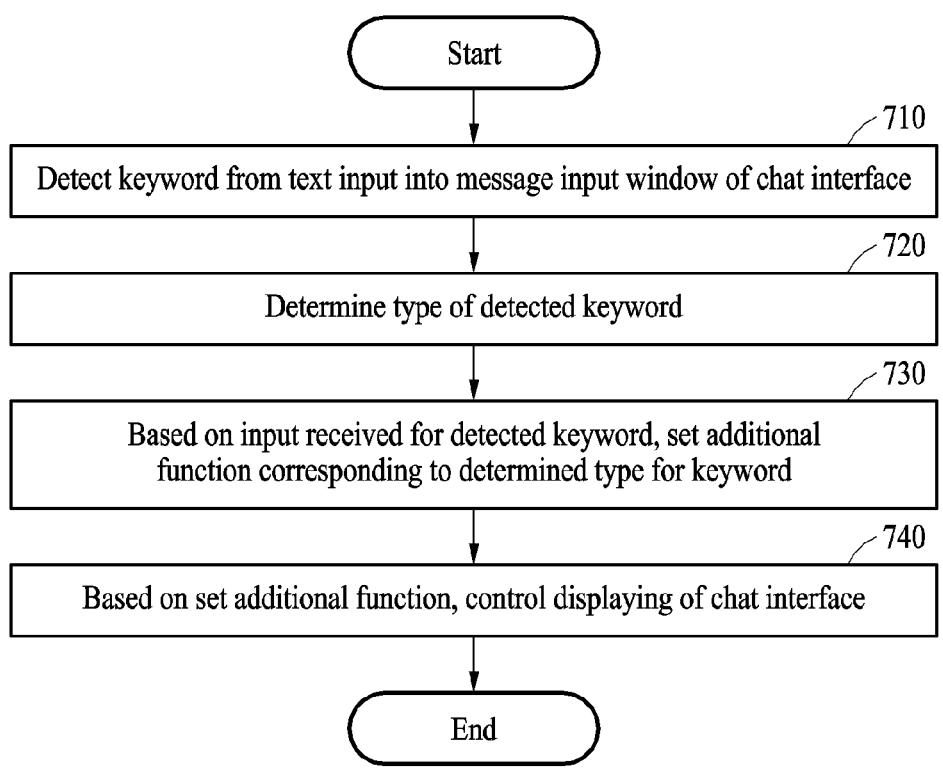
FIG. 7 is a flowchart of an operation of a terminal on which an application for a messaging service is installed according to an embodiment.

FIG. 7 is a flowchart of an operation of a terminal on which an application for a messaging service is installed according to an embodiment.

Referring to FIG. 7, an operating method of a terminal on which an application for a messaging service is installed may include operation 710 of detecting a keyword from a text input into a message input window of a chat interface, operation 720 of determining a type of the detected keyword, operation 730 of, based on an input received for the detected keyword, setting an additional function corresponding to the determined type for the keyword, and operation 740 of, based on the set additional function, controlling displaying of the chat interface.

According to an embodiment, in operation 710, the terminal may detect the keyword from the text input into the message input window of the chat interface. For example, the terminal may detect the keyword by determining whether there is a word included in a set of keywords in the input text.

According to an embodiment, in operation 720, the terminal may determine the type of the detected keyword. According to an embodiment, the type of the keyword may include at least one of a keyword of a first type predetermined to correspond to a search term, a keyword of a second type predetermined for recommending an emoticon, and a keyword of a third type predetermined to correspond to a call of a predetermined function.

According to an embodiment, the keyword of the third type may be a word indicating a function that may be called through the chat interface and may include, for example, a phone number, an account number, an email address, an instruction (e.g., "FaceTalk(페이스톡)", and "Christmas") indicating an application programming interface (API) interoperating with an application, and the like. For example, the keyword of the third type may include at least one word and/or character string format predetermined for calling the predetermined function. The character string format may correspond to a format recognized as a predetermined category such as phone number, account number, and email address. For example, a character string format, such as a phone number, an account number, and an email address, from which a related function is expected to be called and/or a name of a predetermined function provided through the chat interface may be designated as the keyword of the third type.

According to an embodiment, a set of word(s) designated as the keyword of the third type (hereinafter, referred to as "set of keywords of the third type") may be stored in the terminal. For example, the terminal may update a set of keywords of the third type stored in the terminal based on a set of keywords of the third type registered in a server. When the update of the set of keywords of the third type registered in the server is detected, or at regular intervals, the terminal may update the set of keywords of the third type stored in the terminal based on the set of keywords of the third type registered in the server. The terminal may obtain, from the server, a keyword of the third type that is not stored in the terminal among keywords of the third type registered in the server and add the obtained keyword of the third type to the set of keywords of the third type. Alternatively, the set of keywords of the third type stored in the terminal may be replaced with the set of keywords of the third type registered in the server. According to an embodiment, the terminal may not store a set of keywords of the third type separately and may use a set of keywords of the third type stored in a database of keywords of the third type accessible from the server.

According to an embodiment, operation 710 may include at least one of an operation of, based on the set of keywords of the first type in which at least one word predetermined to correspond to the search term is stored, determining whether the detected keyword is the keyword of the first type, an operation of, based on the set of keywords of the second type in which at least one word predetermined for recommending an emoticon is stored, determining whether the detected keyword is the keyword of the second type, and an operation of, based on the set of keywords of the third type in which at least one word and character string format predetermined for calling a predetermined function are stored, determining whether the detected keyword is the keyword of the third type. In other words, the terminal may determine the type of the detected keyword based on a type of a set in which the keyword detected from the input text is included. For example, when a word included in the set of keywords of the first type is detected from the input text, it may be determined that the detected keyword is the keyword of the first type.

According to an embodiment, a keyword may correspond to a plurality of types. For example, "cake" may correspond to the keyword of the first type and the keyword of the second type, and "Christmas" may correspond to the keyword of the first type, the keyword of the second type, and the keyword of the third type.

According to an embodiment, in operation 730, the terminal may set the additional function for the keyword based on the input received for the detected keyword. The additional function set for the keyword may be determined based on the type of the keyword.

For example, when the received input is an input of selecting a first keyword in a region in which the keyword of the first type is displayed, the terminal may add a link to a search results page for the first keyword to a text.

As another example, when the received input is an input of requesting an emoticon related to a second keyword of the second type, the terminal may set an emoticon input function for the second keyword.

As yet another example, when the received input is an input of requesting transmission of a text including a third keyword of the third type, the terminal may add a function link for calling a function corresponding to the third keyword to a message corresponding to the text. When the transmission of the text is requested by the terminal, the server may generate the text as a message and transmit the message through a chatroom. The transmitted message may be displayed in a chat window of the chat interface corresponding to the chatroom. According to an embodiment, the function link is a reference that calls a function corresponding to the keyword of the third type and may correspond to a hyperlink. For example, when a selection input for the function link is received, an API connected to the function link may be called.

Figure 8A:
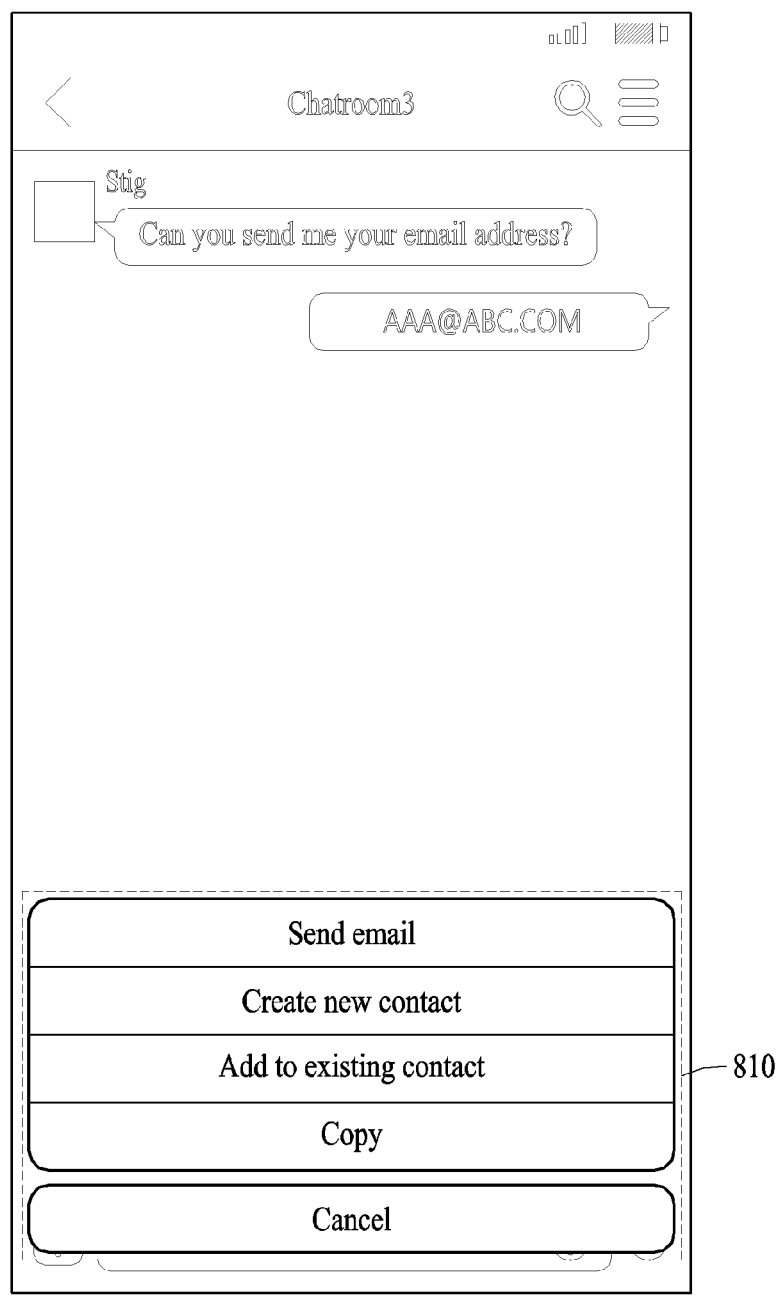
FIGS. 8A to 8C illustrate examples of a screen of a chat interface for providing a function corresponding to a keyword of a third type according to an embodiment.
Figure 8B:
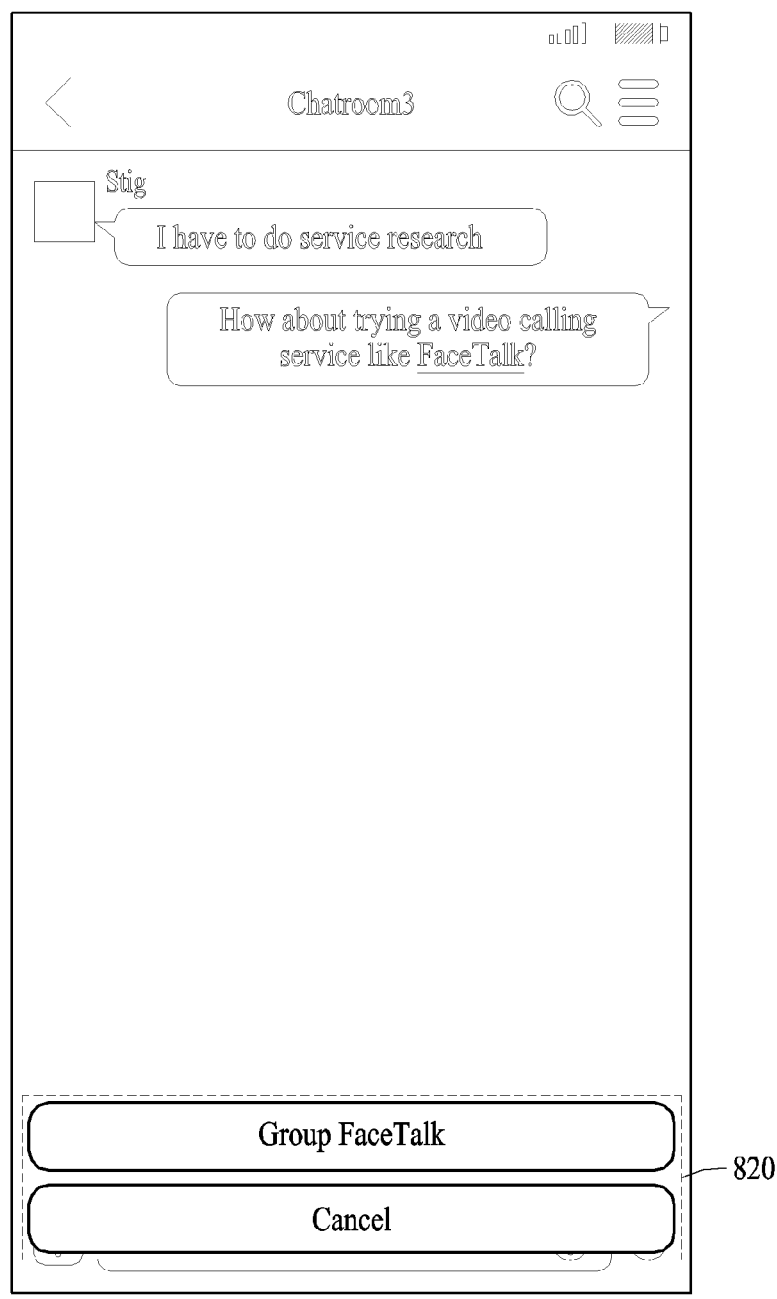
Figure 8C:
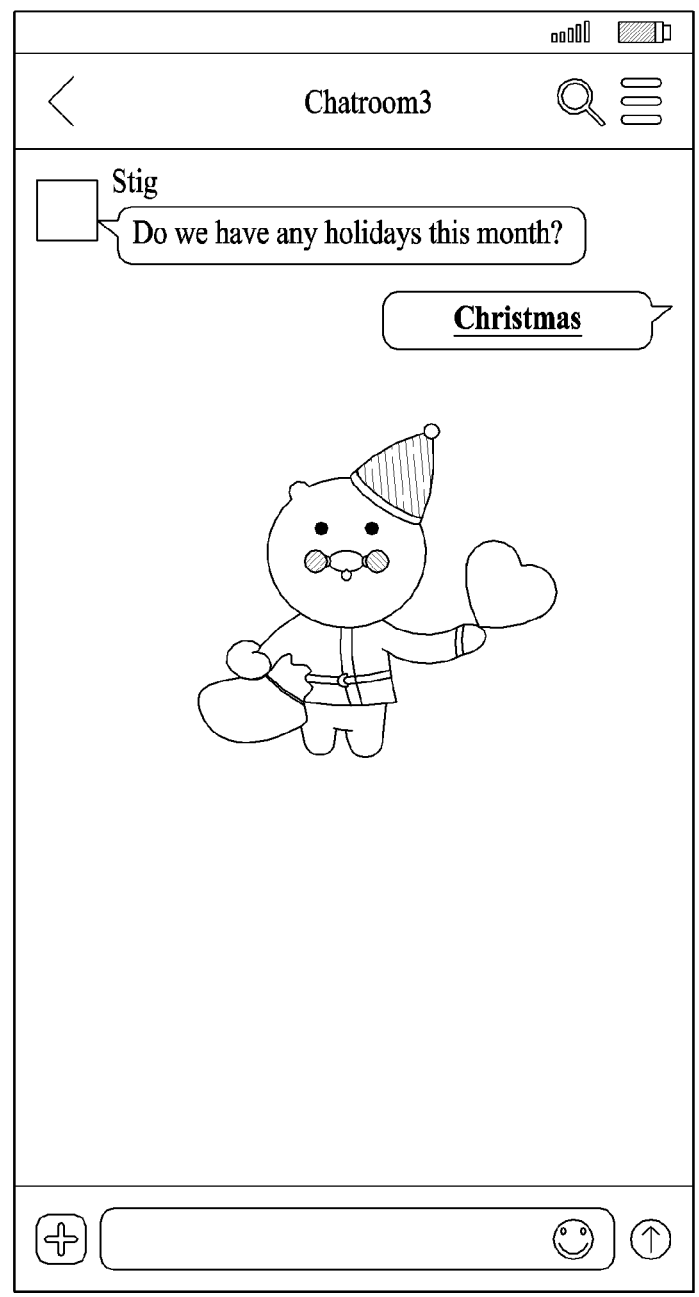

A function link for calling a function related to an email address may be added to a message including an email address, which is a keyword of the third type. The function related to an email address may include a function for sending an email to a corresponding email address, a function for adding the corresponding email address to contacts, and a function for copying the corresponding email address and storing the address in a clipboard. Referring to FIG. 8, in response to an input of selecting an email address to which a function link is added, an API 810 for providing a function related to an email address may be called.

For example, a function link for calling a video call function may be added to a message including a keyword of the third type "FaceTalk". "FaceTalk(페이스톡)" refers to a video call service provided by Kakao Corp. and is a registered trademark of Kakao Corp. The FaceTalk service is a service related to a video call through a chatroom. For example, it may be possible to send a voice call request to at least one participant in a chatroom including a message transmitted to the server through a call of FaceTalk. For example, referring to FIG. 8B, in response to an input of selecting "FaceTalk" to which the function link is added, an API 820 for providing a FaceTalk function may be called.

A function link for calling a content display function may be added to a message including a keyword of the third type "Christmas". The content display function may correspond to a function for displaying content related to the keyword of the third type in the chat interface. For example, referring to FIG. 8C, in response to an input of selecting "Christmas" to which the function link is added, a content display function for outputting a Christmas background in the chat interface may be called. A background of the chat interface may be changed by calling the content display function. In addition, an effect of content playing and then disappearing on the background of the chat interface may be provided. According to an embodiment, in operation 740, the terminal may control displaying of the chat interface. A screen of the chat interface, wherein displaying of the screen is controlled by the terminal, may be output through the terminal.

According to an embodiment, the terminal may control the displaying of the chat interface such that a mark indicating that information about a link corresponding to a first keyword is set is added, based on the setting of the link. The terminal may control the displaying of the chat interface such that the mark indicating that the keyword has the information about the link is added to the first keyword included in a suggestion region. For example, referring to FIG. 3, the screen 301 of the chat interface before the first keyword 311 is selected and the screen 302 of the chat interface after the first keyword 311 is selected may be compared. When the first keyword 331 is selected, the mark indicating that the keyword has the information about the link may be added to the first keyword 331 in the suggestion region 330. According to an embodiment, when the first keyword 311 is selected, the mark indicating that the keyword has the information about the link may be added to the text "Seongsu-dong" corresponding to the first keyword 331 in the message input window 340.

According to an embodiment, the terminal may control the displaying of the chat interface based on the setting of the emoticon input function such that the interfacing object for inputting an emoticon corresponding to the second keyword is displayed. For example, referring to FIG. 5A, when an input of requesting the emoticon corresponding to the second keyword of the second type is received by the input of selecting the button 511, the interfacing object (e.g., interfacing objects 520, 530, and/or 540) for inputting the emoticon corresponding to the second keyword may be displayed in the terminal. An emoticon image or thumbnail included in a list of recommended emoticons (e.g., the list of recommended emoticons 520 and/or 530) may be received from a server.

Figure 9:
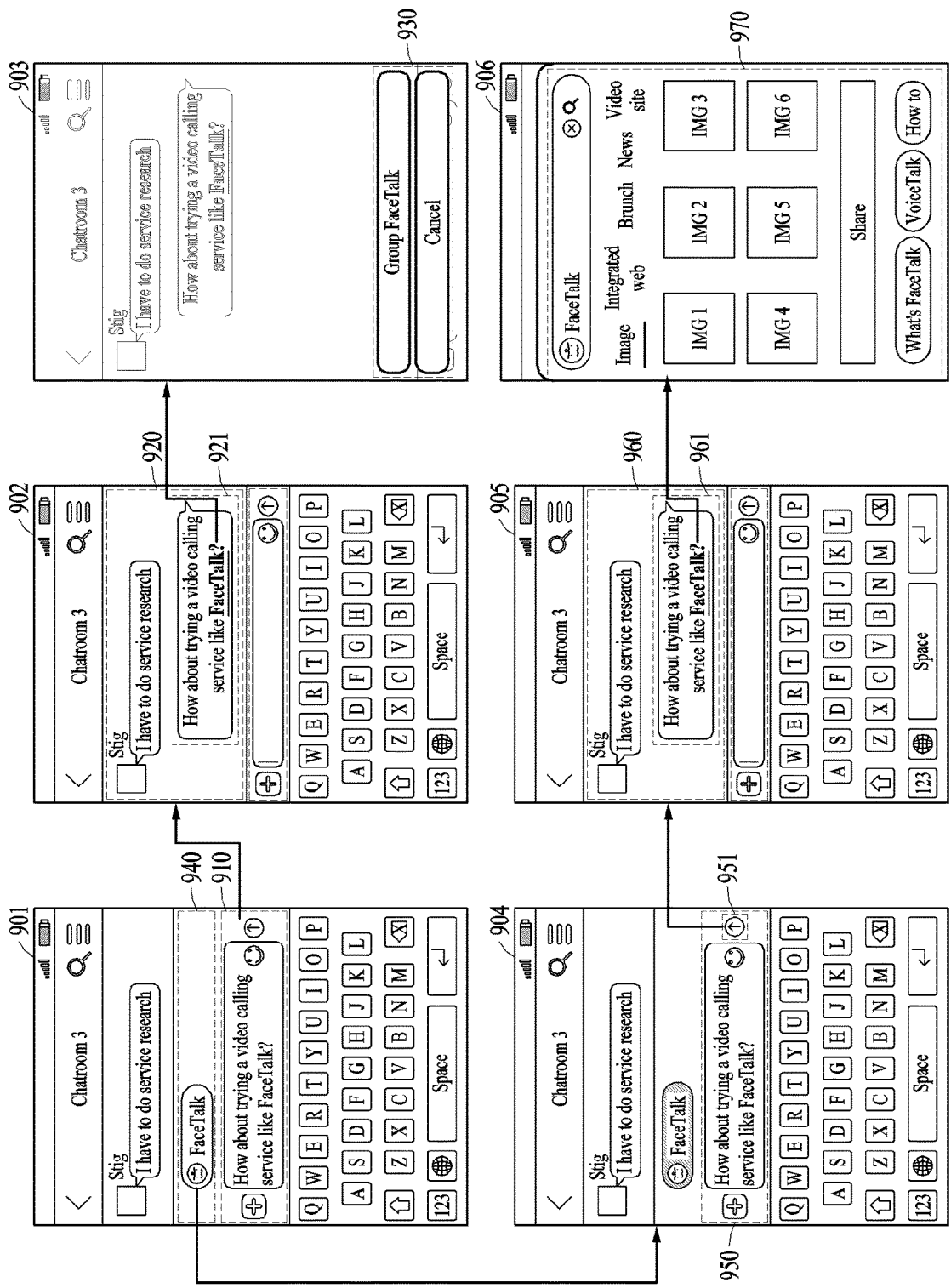
FIG. 9 illustrates an example of a screen of a chat interface related to a function link and a link set in a message according to an embodiment.

According to an embodiment, the terminal may control the displaying of the chat interface based on the setting of a function link such that a mark indicating that a function link related to a third keyword is added is added. For example, the terminal may control the displaying of the chat interface such that the mark indicating that the keyword has the function link is added to the third keyword included in the message. For example, referring to a screen 901 of a chat interface in a first input mode illustrated in FIG. 9, an input of selecting a message transmission button 911 may be an input of requesting transmission of a text input into a message input window 910. The text input into the message input window 910 may include a third keyword "FaceTalk". When the input of requesting the transmission of the text is received, a function link for calling a function corresponding to the third keyword may be added to a message corresponding to the text, and a message 921 corresponding to the text may be displayed in a chat window 920 as shown in the screen 902. The mark (e.g., underline) indicating that the keyword has the function link may be added to the third keyword "FaceTalk" included in the message 921. When an input of selecting the third keyword included in the message 921 is received, an API 930 for providing a "FaceTalk" function may be called by the function link as shown in a screen 903.

According to an embodiment, when a detected keyword corresponds to a keyword of a first type and a third type, a link or a function link may be added based on a type of input received for the keyword. For example, when a link is added to a keyword, an input of selecting the keyword included in a message may cause a search results page for the keyword linked to the link to be provided. For example, referring to the screen 901 of the chat interface illustrated in FIG. 9, when "FaceTalk" is a keyword of the first type and the third type, the terminal may include a suggestion region 940 displaying the keyword of the first type "FaceTalk". When an input of selecting "FaceTalk" is received through the suggestion region 940, a link related to the keyword of the first type may be added to the text input into the message input window 910, and a mark indicating that the text has a link related to the keyword "FaceTalk" may be added by control of the terminal as shown in a screen 904. For example, the link may be added to "FaceTalk" of the text input into the message input window 910. When an input of selecting a message transmission button 951 is received, the text input into a message input window 950 may be transmitted in a form of a message. A message 961 corresponding to the text may be displayed in a chat window 960 by the control of the terminal as shown in a screen 905. The mark (e.g., underline) indicating that the text is the keyword to which the link is added may be added to the third keyword 50 "FaceTalk" included in the message 961. When an input of selecting "FaceTalk" included in the message 961 is received, a search results page 970 for a search term "FaceTalk" may be provided by the link as shown in a screen 906.

According to an embodiment, the message 921 included in the screen 902 is displayed in the same way that the message 961 included in the screen 905 is displayed, with both messages having "FaceTalk" underlined. However, different functions, such as a function for providing the search results page 970, a function for calling the API 930 for providing a "FaceTalk" function, or the like, may be performed depending on a type of the link added to "FaceTalk".

Figure 10:
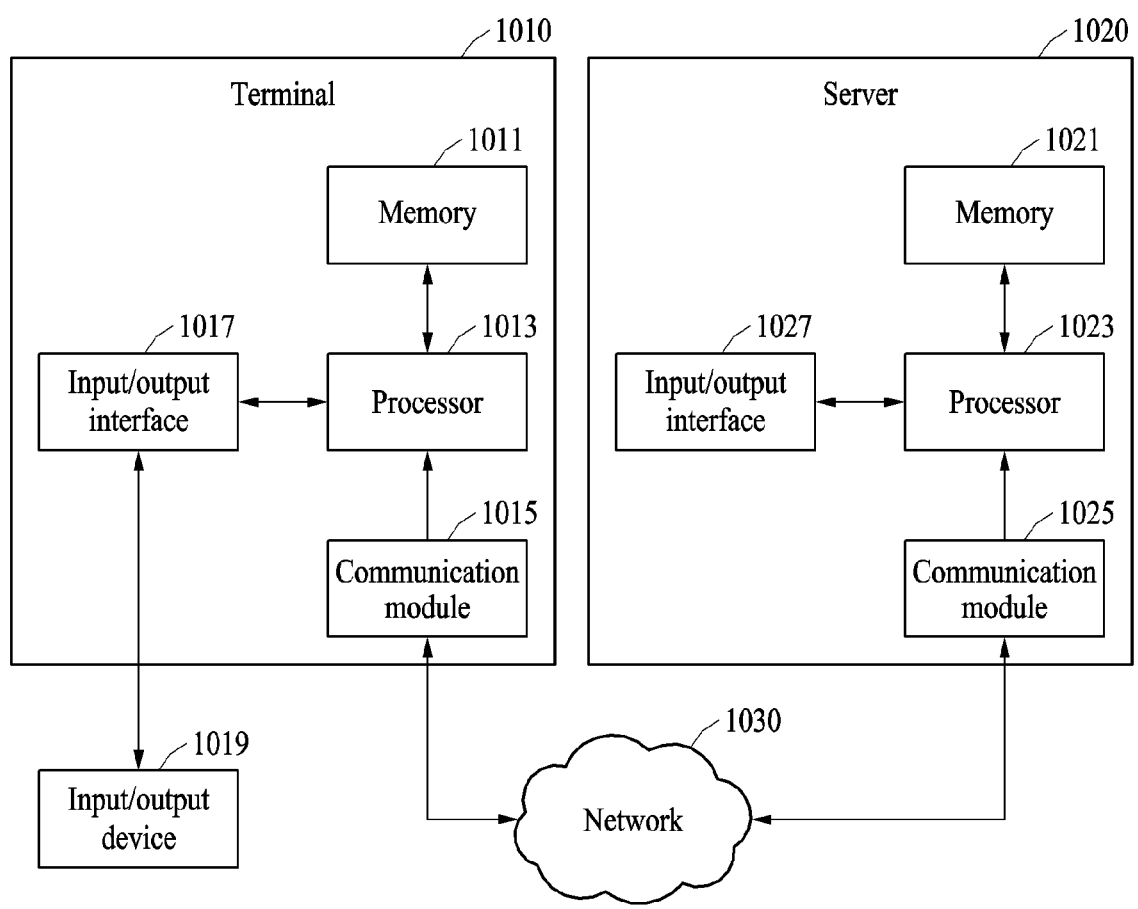
FIG. 10 illustrates an example of a configuration of hardware of a system for managing a mobile device according to an embodiment.

FIG. 10 illustrates an example of a configuration of hardware of a system for managing a mobile device according to an embodiment.

Referring to FIG. 10, a system according to an embodiment may include a terminal 1010 and a server 1020 connected to each other through a network 1030.

The terminal 1010 may be a mobile terminal implemented as a computer device. For example, the terminal 1010 may communicate with the server 1020 and/or other electronic devices through the network 1030 by using a wired or wireless communication method.

The server 1020 may be implemented as one or more computer devices providing commands, code, files, content, services, and the like by communicating with the terminal 1010 and/or another server through the network 1030. A communication method may not be limited and may include a communication method using a communication network (e.g., a mobile communication network, wired Internet, wireless Internet, and a broadcasting network) that may be included in the network 1030 and a short-distance wireless communication method between devices. For example, the network 1030 may include one or more networks among networks, such as a personal area network (PAN), a local area network (LAN), a campus area network (CAN), a metropolitan area network (MAN), a wide area network (WAN), a broadband network (BBN), the Internet, and the like.

According to an embodiment, the server 1020 may provide a file for installing an application to the terminal 1010 accessing the server 1020 through the network 1030. In this case, the terminal 1010 may install an application (e.g., a messenger application) using a file provided by the server 1020. In addition, under control by an operating system (OS) in the terminal 1010 and one or more programs (e.g., a browser or an installed application) in the terminal 1010, the terminal 1010 may access the server 1020 and receive a service or content provided by the server 1020. For example, when the terminal 1010 transmits a service request message to the server 1020 through the network 1030 by control of an application, the server 1020 may transmit code corresponding to the service request message to the terminal 1010 and the terminal 1010 may provide a user with content by composing and displaying a screen according to the code. For example, as described above, the terminal 1010 may receive a set of keywords of a first type, a set of keywords of a second type, and/or a set of keywords of a third type from the server 1020.

According to an embodiment, the terminal 1010 and the server 1020 may respectively include memories 1011 and 1021, processors 1013 and 1023, communication modules 1015 and 1025, and input/output interfaces 1017 and 1027.

The processors 1013 and 1023 may perform at least one operation described above with reference to FIGS. 1 to 9. For example, the processor 1013 may perform at least one operation of the operating method of the terminal 1010 on which an application for a messaging service is installed described above with reference to FIGS. 1 to 9, and the processor 1023 may perform at least one operation of the operating method of the server 1020 providing a messaging service described above with reference to FIGS. 1 to 9. The processors 1013 and 1023 may be configured to process commands of a computer program by performing basic arithmetic, logic, and an input/output operation. The commands may be provided to the processors 1013 and 1023 by the memories 1011 and 1021 or the communication modules 1015 and 1025.

The memories 1011 and 1021 may be a computer-readable storage medium, which may be volatile or non-volatile memory. The memories 1011 and 1021 may store information for the messaging service described above with reference to FIGS. 1 to 9.

The memory 1011 may include code for a messenger application operated by the terminal 1010 by installation in the terminal 1010 of files provided through the network 1030 by the server 1020.

The memory 1021 may store program implementing operations of a server providing the messaging service described above with reference to FIGS. 1 to 9.

The communication modules 1015 and 1025 may provide a function for the terminal 1010 and the server 1020 to communicate with each other through the network 1030 and a function for the terminal 1010 and the server 1020 to communicate with another electronic device or another server through the network 1030.

For example, a request generated by the processor 1013 of the terminal 1010 according to program code on a messenger application stored in a storage medium, such as the memory 1011, may be transmitted to the server 1020 through the network 1030 by control of the communication module 1015.

For example, control signals, commands, content, files, and the like provided by control of the processor 1023 of the server 1020 may be received by the terminal 1010 through the communication module 1015 of the terminal 1010 after passing through the communication module 1025 and the network 1030.

The input/output interfaces 1017 and 1027 may be an interface with an input/output device 1019. For example, an input device may include a device, such as a keyboard or a mouse, and an output device may include a device, such as a display for displaying a communication session of an application. In another example, the input/output interface 1017 may be an interface with a device having input and output functions, such as a touch screen. Specifically, for example, when the processor 1013 of the terminal 1010 processes commands of a computer program loaded in the memory 1011, content or a service screen composed by using data provided by the server 1020 may be displayed on a display through the input/output interface 1017. An input received from a user through the input/output device 1019 may be provided in a form processable by the processor 1013 of the terminal 1010 through the input/output interface 1017.

According to an embodiment, the terminal 1010 and the server 1020 may include other components than the illustrated ones in FIG. 10. For example, the terminal 1010 may be implemented to include at least a portion of the input/output device 1019 described above or may further include other components, such as transceivers, global positioning system (GPS) modules, cameras, various types of sensors, databases, and the like.

The embodiments described herein may be implemented using hardware components, software components and/or combinations thereof. A processing device may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an OS and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as, parallel processors.

Software may include a computer program, a piece of code, an instruction, or some combination thereof, to independently or collectively instruct or configure the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored in a non-transitory computer-readable recording medium.

The methods according to the embodiments may be recorded in non-transitory computer-readable media including program instructions to implement various operations of the embodiments. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs or DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

The above-described hardware devices may be configured to act as one or more software modules in order to perform the operations of the above-described embodiments, or vice versa.

As described above, although the embodiments have been described with reference to the limited drawings, one of ordinary skill in the art may apply various technical modifications and variations based thereon. For example, suitable results may be achieved if the described techniques are performed in a different order and/or if components in a described system, architecture, device, or circuit are combined in a different manner or replaced or supplemented by other components or their equivalents.

Therefore, other implementations, other embodiments, and equivalents to the claims are also within the scope of the following claims.

What is claimed is:

1. An operating method of a terminal on which an application for a messaging service is installed, the operating method comprising:
    displaying one or more keywords of a first type in a chat interface, wherein the one or more keywords of the first type are detected from a text input into a message input window of the chat interface in a first input mode;

receiving input selecting a first keyword of the first type among the one or more keywords of the first type displayed in the chat interface;

setting, for a word that is part of the text input in the message input window that corresponds to the first keyword of the first type, information about a link that invokes at least one of a search results page for the first keyword of the first type or a selected function of a separate application for the first keyword of the first type using an application programming interface of the separate application, such that the link is usable by a recipient of a message including the word of the text input by selecting the word of the text input in the message;

based on a request corresponding to one or more keywords of a second type detected from the text input, changing an input mode of the chat interface to a second input mode; and in response to the input mode being changed, replacing displaying of the one or more keywords of the first type with displaying of an interfacing object corresponding to the one or more keywords of the second type.

2. The operating method of claim 1, further comprising:
when the input mode of the chat interface is changed to the first input mode, adding a mark indicating the one or more keywords of the first type to the text input into the message input window; and
when the input mode of the chat interface is changed to the second input mode, adding a mark indicating the one or more keywords of the second type to the text input into the message input window.

3. The operating method of claim 1, further comprising:
when the input mode of the chat interface is changed to the first input mode, replacing the displaying of the interfacing object corresponding to the one or more keywords of the second type with the displaying of the one or more keywords of the first type.

4. The operating method of claim 1, wherein the replacing of the displaying of the one or more keywords of the first type with the displaying of the interfacing object corresponding to the one or more keywords of the second type comprises:
deactivating the displaying of the one or more keywords of the first type; and
displaying the interfacing object in the chat interface to input an emoticon related to the one or more keywords of the second type.

5. The operating method of claim 4, wherein the displaying of the interfacing object corresponding to the one or more keywords of the second type comprises:
displaying a list of recommended emoticons corresponding to the one or more keywords of the second type; and
based on an input of selecting a recommended emoticon, displaying a preview window for the selected emoticon in the chat interface.

6. The operating method of claim 1, wherein a region in which the one or more keywords of the first type are displayed in the chat interface at least partially overlaps a region in which the interfacing object corresponding to the one or more keywords of the second type is displayed.

7. The operating method of claim 1, wherein setting information about the link includes setting information about the link to a search results page of a web browser using the first keyword of the first type as a search term.

8. The operating method of claim 1, wherein the displaying of the one or more keywords of the first type in the chat interface comprises, based on an input of selecting the first keyword of the first type displayed in the chat interface, displaying the one or more keywords of the first type by distinguishing between the first keyword of the first type and a second keyword of the first type among the one or more keywords of the first type.

9. The operating method of claim 1, wherein
the one or more keywords of the first type include at least one word that corresponds to a search term, and
the one or more keywords of the second type includes at least one word for recommending an emoticon.

10. A non-transitory computer-readable storage medium storing instructions that, when executed by a processor, cause the processor to perform actions, the actions comprising:
displaying one or more keywords of a first type in a chat interface, wherein the one or more keywords of the first type are detected from a text input into a message input window of the chat interface in a first input mode;
receiving input selecting a first keyword of the first type among the one or more keywords of the first type displayed in the chat interface;
setting, for a word that is part of the text input in the message input window that corresponds to the first keyword of the first type, information about a link that invokes at least one of a search results page for the first keyword of the first type or a selected function of a separate application for the first keyword of the first type using an application programming interface of the separate application, such that the link is usable by a recipient of a message including the word of the text input by selecting the word of the text input in the message;
based on a request corresponding to one or more keywords of a second type detected from the text input, changing an input mode of the chat interface to a second input mode; and
in response to the input mode being changed, replacing displaying of the one or more keywords of the first type with displaying of an interfacing object corresponding to the one or more keywords of the second type.

11. A terminal on which an application for a messaging service is installed, the terminal comprising:
at least one processor configured to:
display one or more keywords of a first type in a chat interface, wherein the one or more keywords of the first type are detected from a text input into a message input window of the chat interface in a first input mode;
receive input selecting a first keyword of the first type among the one or more keywords of the first type displayed in the chat interface
set, for a word that is part of the text input in the message input window that corresponds to the first keyword of the first type, information about a link that invokes at least one of a search results page for the first keyword of the first type or a selected function of a separate application for the first keyword of the first type using an application programming interface of the separate application, such that the link is usable by a recipient of a message including the word of the text input by selecting the word of the text input in the message;
based on a request corresponding to one or more keywords of a second type detected from the text, change an input mode of the chat interface to a second input mode; and
in response to the input mode being changed, replace display of the one or more keywords of the first type with display of an interfacing object corresponding to the one or mor keywords of the second type.

12. The terminal of claim 11, wherein the processor is further configured to:
 when the input mode of the chat interface is changed to the first input mode, add a mark indicating the one or more keywords of the first type to the text input into the message input window; and
 when the input mode of the chat interface is changed to the second input mode, add a mark indicating the one or more keywords of the second type to the text input into the message input window.

13. The terminal of claim 11, wherein the processor is configured to, when the input mode of the chat interface is changed to the first input mode, replace the display of the interfacing object corresponding to the one or more keywords of the second type with the display of the one or more keywords of the first type.

14. The terminal of claim 11, wherein the processor replaces display of the one or more keywords of the first type with display of the interfacing object corresponding to the one or more keywords of the second type by being further configured to:
 deactivate the display of the one or more keywords of the first type; and
 display the interfacing object in the chat interface to input an emoticon related to the one or more keywords of the second type.

15. The terminal of claim 11, wherein the processor displays the interfacing object corresponding to the one or more keywords of the second type by being further configured to:
 display a list of recommended emoticons corresponding to the one or more keywords of the second type; and
 based on an input of selecting a recommended emoticon, display a preview window for the selected emoticon in the chat interface.

16. The terminal of claim 11, wherein a region in which the one or more keywords of the first type are displayed in the chat interface at least partially overlaps a region in which the interfacing object corresponding to the one or more keywords of the second type is displayed.

17. The terminal of claim 11, wherein the processor displays the one or more keywords of the first type in the chat interface by being further configured to:
 based on an input of selecting the first keyword of the first type displayed in the chat interface, display the one or more keywords of the first type by distinguishing between the first keyword of the first type and a second keyword of the first type of the one or more keywords of the first type.

18. The non-transitory computer-readable storage medium of claim 10, the actions further comprising:
 when the input mode of the chat interface is changed to the first input mode, adding a mark indicating the one or more keywords of the first type to the text input into the message input window; and
 when the input mode of the chat interface is changed to the second input mode, adding a mark indicating the one or more keywords of the second type to the text input into the message input window.

19. The non-transitory computer-readable storage medium of claim 10, the actions further comprising:
 when the input mode of the chat interface is changed to the first input mode, replacing the displaying of the interfacing object corresponding to the one or more keywords of the second type with the displaying of the one or more keywords of the first type.

20. The non-transitory computer-readable storage medium of claim 10, wherein setting information about the link includes setting information about the link to the search results page of a web browser using the first keyword of the first type as a search term.

\* \* \* \* \*